(12) United States Patent
Oka et al.

(10) Patent No.: US 11,579,492 B2
(45) Date of Patent: Feb. 14, 2023

(54) LIQUID CRYSTAL OPTICAL ELEMENT COMPRISING FIRST AND SECOND LIQUID CRYSTAL LAYERS EACH HAVING RESPECTIVE LIQUID CRYSTAL MOLECULES WITH A FIXED ALIGNMENT DIRECTION

(71) Applicant: Japan Display Inc., Tokyo (JP)

(72) Inventors: Shinichiro Oka, Tokyo (JP); Yasushi Tomioka, Tokyo (JP); Koichi Igeta, Tokyo (JP); Junji Kobashi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/655,676

(22) Filed: Mar. 21, 2022

(65) Prior Publication Data

US 2022/0308402 A1    Sep. 29, 2022

(30) Foreign Application Priority Data

Mar. 23, 2021    (JP) .............................. JP2021-048692

(51) Int. Cl.
  *G02F 1/1337*    (2006.01)
  *G02F 1/1335*    (2006.01)

(52) U.S. Cl.
  CPC .. *G02F 1/133738* (2021.01); *G02F 1/133504* (2013.01); *G02F 1/133726* (2021.01)

(58) Field of Classification Search
  CPC ......... G02F 1/133738; G02F 1/133726; G02F 2201/305; G02F 2201/307
  See application file for complete search history.

(56) References Cited

U.S. PATENT DOCUMENTS

| | | | |
|---|---|---|---|
| 2011/0304799 A1* | 12/2011 | Lee | G02F 1/13475 427/508 |
| 2012/0062822 A1* | 3/2012 | Do | G02F 1/133528 349/194 |
| 2015/0002794 A1* | 1/2015 | Liu | G02F 1/134309 445/25 |
| 2015/0219893 A1* | 8/2015 | Chen | G02B 3/0087 349/200 |
| 2015/0277166 A1* | 10/2015 | Kim | G02F 1/133753 349/128 |
| 2016/0033698 A1 | 2/2016 | Escuti et al. | |
| 2020/0271842 A1 | 8/2020 | Yoshida | |

FOREIGN PATENT DOCUMENTS

| | | |
|---|---|---|
| JP | 8-262445 A | 10/1996 |
| JP | 2017-522601 A | 8/2017 |
| JP | 2018-84679 A | 5/2018 |

* cited by examiner

*Primary Examiner* — Paul C Lee
(74) *Attorney, Agent, or Firm* — Maier & Maier, PLLC (57) ABSTRACT

According to one embodiment, a liquid crystal optical element includes a substrate, a plurality of structures, a first liquid crystal layer including a plurality of liquid crystal molecules having alignment directions fixed, and a second liquid crystal layer including a plurality of liquid crystal molecules having alignment directions fixed. In an area overlapping a groove, a first director of the first liquid crystal layer extends along the groove, and a second director of the second liquid crystal layer is uniformly aligned with the first director of the second surface side, on the third surface side, and turns in planar view.

11 Claims, 8 Drawing Sheets

LIQUID CRYSTAL OPTICAL ELEMENT COMPRISING FIRST AND SECOND LIQUID CRYSTAL LAYERS EACH HAVING RESPECTIVE LIQUID CRYSTAL MOLECULES WITH A FIXED ALIGNMENT DIRECTION

CROSS-REFERENCE TO RELATED APPLICATIONS

This application is based upon and claims the benefit of priority from Japanese Patent Application No. 2021-048692, filed Mar. 23, 2021, the entire contents of which are incorporated herein by reference.

FIELD

Embodiments described herein relate generally to a liquid crystal optical element.

BACKGROUND

For example, a liquid crystal polarization grating using a liquid crystal material has been proposed. Such a liquid crystal polarization grating splits incident light into zero-order diffracted light and first-order diffracted light when light of wavelength λ is made incident. When such a liquid crystal polarization grating is realized, increase in the productivity desired.

DETAILED DESCRIPTION

In general, according to one embodiment, there is provided a liquid crystal optical element comprising: a substrate including a main surface; a plurality of structures each including a bottom surface opposed to the main surface and an upper surface on a side opposite to the bottom surface, and arranged and spaced apart at intervals; a first liquid crystal layer including a first surface opposed to the main surface, a second surface on a side opposite to the first surface, and a plurality of liquid crystal molecules having alignment directions fixed, and provided between the plurality of structures and cured; and a second liquid crystal layer including a third surface opposed to the upper surface and being in contact with the second surface, a fourth surface on a side opposite to the third surface, and a plurality of liquid crystal molecules having alignment directions fixed, and cured, a pair of adjacent structures of the plurality of structures forming a groove therebetween, in an area overlapping the groove, a first director of the first liquid crystal layer extending along the groove, and a second director of the second liquid crystal layer being uniformly aligned with the first director of the second surface side, on the third surface side, and turning in planar view.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. In addition, in the specification and drawings, the same elements as those described in connection with preceding drawings are denoted by like reference numbers, and detailed description thereof is omitted unless necessary.

In the figures, an X-axis, a Y-axis and a Z-axis orthogonal to each other are described to facilitate understanding as needed. The direction along the X-axis is referred to as an X direction or a first direction, the direction along the Y axis is referred to as a Y direction, a second direction, or a direction intersecting the X direction, and the direction along the Z axis is referred to as a Z direction or a third direction. A plane defined by the X-axis and the Y-axis is referred to as an X-Y plane, and a plane defined by the X-axis and Z-axis is referred to as an X-Z plane. Viewing the X-Y plane is referred to as planar view.

Figure 1:
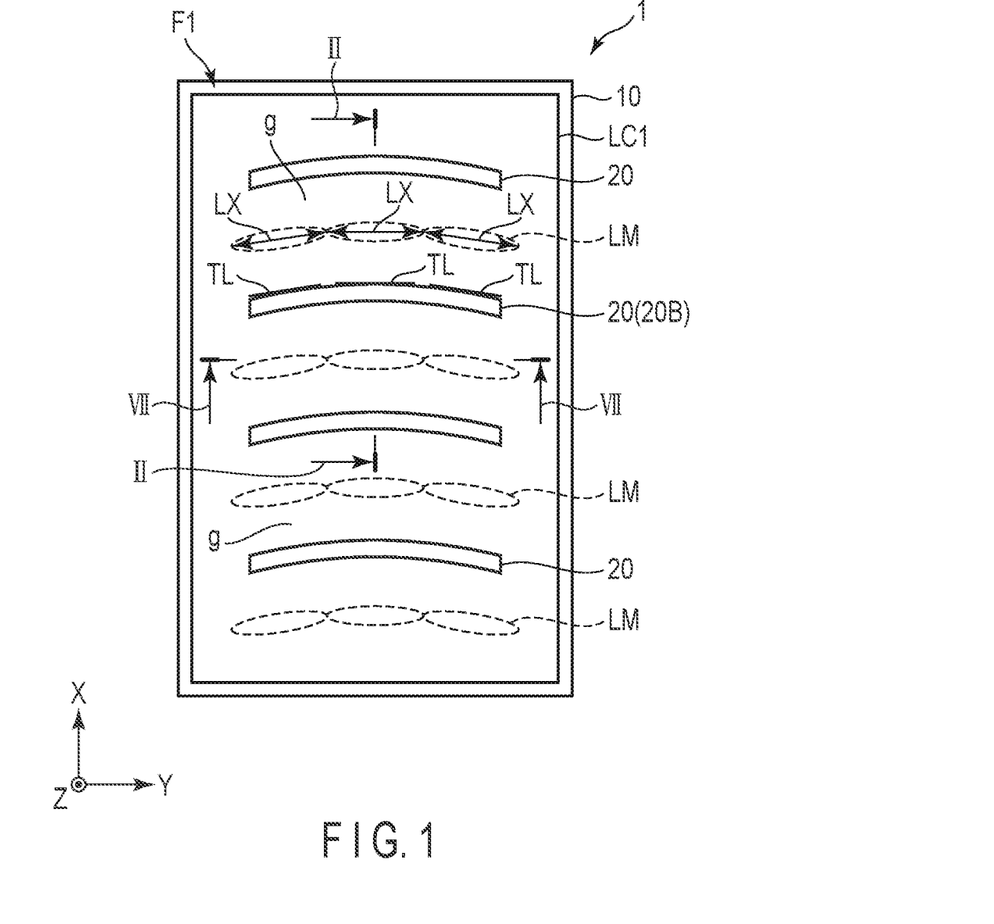
FIG. 1 is a plan view illustrating an alignment direction of a plurality of liquid crystal molecules in a first liquid crystal layer of a liquid crystal optical element according to one embodiment.
Figure 2:
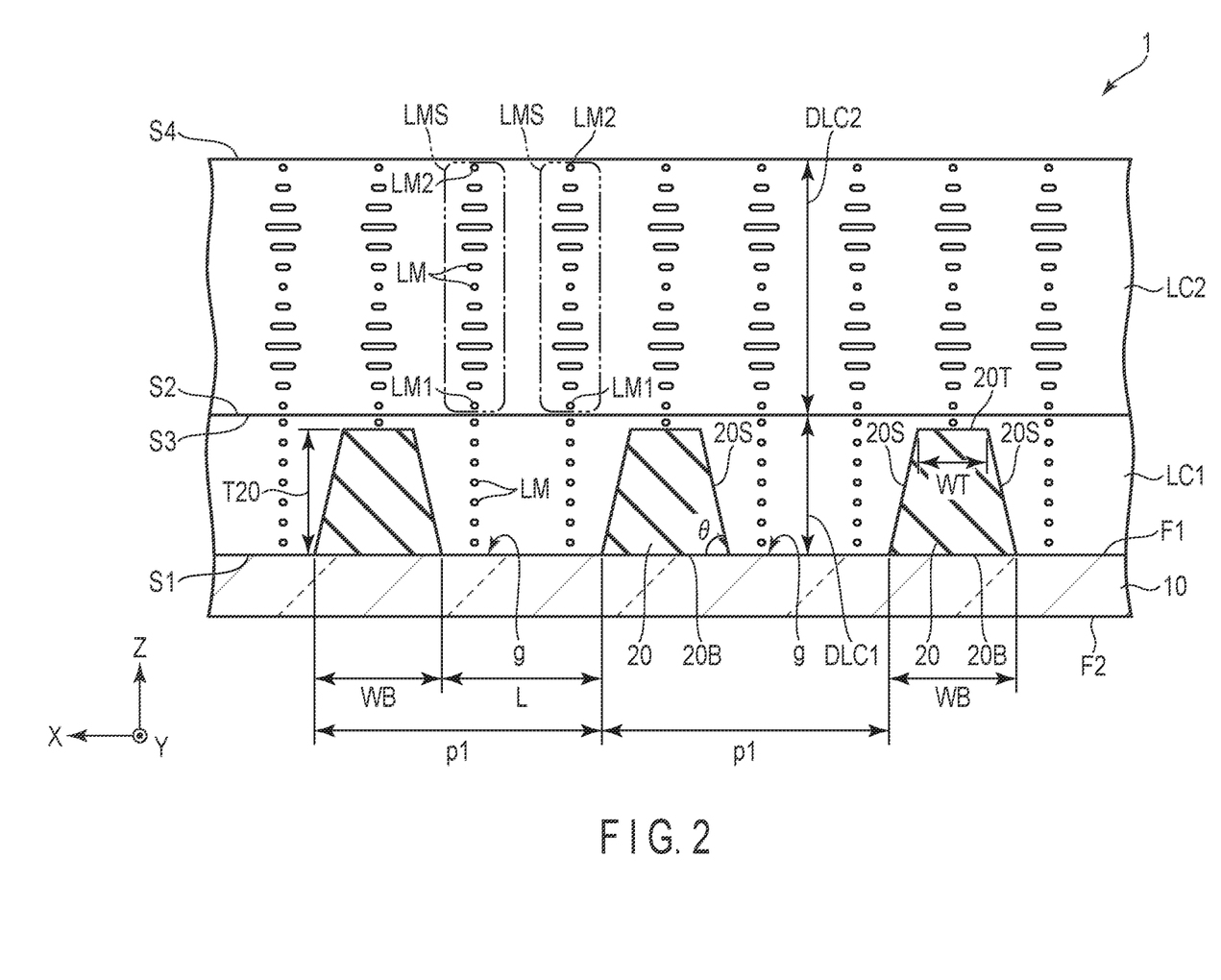
FIG. 2 is a cross-sectional view showing the liquid crystal optical element taken along line II-II in FIG. 1.

FIG. 1 is a plan view illustrating an alignment direction of a plurality of liquid crystal molecules LM in a first liquid crystal layer LC1 of a liquid crystal optical element 1 according to one embodiment. FIG. 2 is a cross-sectional view showing a liquid crystal optical element 1 taken along line II-II in FIG. 1.

As shown in FIG. 2, the liquid crystal optical element 1 comprises a substrate 10, a plurality of structures 20, a first liquid crystal layer LC1, and a second liquid crystal layer LC2. FIG. 2 is a cross-sectional view showing intersections of the structures 20 and tangents of the structures 20 (virtual straight lines in the Y direction).

The substrate 10 is a transparent substrate that allows light to be transmitted and is composed of, for example, a transparent glass plate or a transparent synthetic resin plate. The substrate 10 may be composed of, for example, a transparent synthetic resin plate having flexibility. The substrate 10 can be formed in any shape. For example, the substrate 10 may be curved. A refractive index of the substrate 10 is, for example, larger than the refractive index of air.

In the present specification, "light" includes visible light and invisible light. For example, the wavelength at the lower limit of the visible light range is 360 nm or more and 400 nm or less, and the wavelength at the upper limit of the visible light range is 760 nm or more and 830 nm or less. The visible light contains a first component (blue component) in a first wavelength band (for example, 400 to 500 nm), a second component (green component) in a second wavelength band (for example, 500 to 600 nm), and a third component (red component) in a third wavelength band (for example, 600 to 700 nm). The invisible light contains ultraviolet light in a wavelength band shorter than the first wavelength band, and infrared light in a wavelength band longer than the third wavelength band.

In the present specification, "transparent" desirably indicates colorless and transparent. However, "transparent" may also indicate translucent or transparent in color.

The substrate 10 is formed in a flat plate shape along the X-Y plane, and has a main surface F1 and a main surface F2 on the side opposite to the main surface F1. The main surface F1 and the main surface F2 are substantially parallel to the X-Y plane and are opposed to each other in the Z direction. The main surface F2 is in contact with, for example, air but may be covered with other thin films.

The plurality of structures 20 are disposed above the main surface F1. In the embodiment, the plurality of structures 20 are disposed on the main surface F1. Each of the structures 20 is in contact with the main surface F1, but a thin film such as an insulating film may be interposed between the structure 20 and the main surface F1. The structures 20 are formed of, for example, organic materials, but may also be formed of inorganic materials.

The plurality of structures 20 are spaced apart at predetermined first pitches p1 in the X direction. The structure 20 in this case is a convex body extending from the main surface F1 in the Z direction. The plurality of structures 20 comprise a function of defining the alignment direction of the liquid crystal molecules LM contained in the first liquid crystal layer LC1, which will be described later.

The structure 20 has a cross-sectional shape tapered along the Z direction in the X-Z plane. In other words, the structure 20 has a bottom surface 20B opposed to the main surface F1 and an upper surface 20T on a side opposite to the bottom surface 20B. In the embodiment, the bottom surface 20B is in contact with the main surface F1. In the direction (X direction) in which a pair of structures 20 are adjacent to each other, a width WB of the bottom surface 20B is larger than a width WT of the upper surface 20T.

In the example shown in FIG. 1, the main surface F1 is exposed between the adjacent bottom surfaces 20B. However, the main surface F1 between the adjacent bottom surfaces 20B may be covered with a thin film.

In addition, the structure 20 has side surfaces 20S between the bottom surface 20B and the upper surface 20T. The side surface 20S of the structure 20 and the side surface 20S of the adjacent structure 20 are opposed to each other in the X direction. Each of the side surfaces 20S is a tilted plane that is tilted to the Z direction.

In the configuration example in which the structures 20 are in contact with the substrate 10, a refractive index of the structures 20 is substantially the same as that of the substrate 10. For this reason, the light reaching an interface between the substrate 10 and the structures 20 is hardly refracted.

Each of the structures 20 has a substantially constant height T20. The height T20 corresponds to a distance from the bottom surface 20B to the upper surface 20T in the Z direction. The height T20 of the structures 20 exceeds the width WB of the bottom surface 20B. For example, the height T20 is 100 to 2,000 nm and, desirably, 300 to 1,000 nm. As described above, the height T20 is desirably 1 μm or less and a retardation of the first liquid crystal layer LC1 is desirably small.

The width WB is, for example, 50 to 1,500 nm and, desirably, 100 to 1,000 nm. A ratio of the width WB to the height T20 (WB/T20) is smaller than 1 and larger than 0.1.

An angle θ between the side surface 20S and the bottom surface 20B of the structure 20 is desirably smaller than 90 degrees. For example, the angle θ is 65 to 88 degrees and, desirably, 75 to 85 degrees. A pair of adjacent structures 20 of the plurality of structures 20 form a groove g between them.

The first liquid crystal layer LC1 is provided between the plurality of structures 20 and surrounds each of the structures 20. The first liquid crystal layer LC1 has a first surface S1 opposed to the main surface F1 and a second surface S2 on a side opposite to the first surface S1. In the embodiment, the upper surface 20T is covered with the first liquid crystal layer LC1 and is located between the main surface F1 and the second surface S2.

The first surface S1 is an uneven surface and is in contact with the upper surface 20T and the side surfaces 20S. Moreover, in the example shown in FIG. 1, the first surface S1 is in contact with the main surface F1 between the adjacent structures 20. A horizontal alignment film may be interposed between a base including both the substrate 10 and the plurality of structures 20, and the first liquid crystal layer LC1. When the above-mentioned horizontal alignment film is used, the horizontal alignment film does not need to be subjected to alignment treatment.

The first liquid crystal layer LC1 has a thickness DLC1. The thickness DLC1 corresponds to a distance from the first surface S1 to the second surface S2 in the Z direction in the area outside the structures 20. In the embodiment, the thickness DLC1 exceeds the height T20.

In addition, a distance L between the bottom surfaces 20B of a pair of structures 20 adjacent to each other in the X direction is substantially the same as the height T20 or less than the height T20. For example, a ratio of the distance L to the height T20 (L/T20) is 1 or less and exceeds 0.3. The distance L is 50 to 1,500 nm and, desirably, 100 to 1,000 nm.

In the embodiment, the width WB is less than the distance L and is less than the height T20. In addition, in the embodiment, the width WB is 130 nm, the distance L is 280 nm, and the height T20 is 450 nm.

Incidentally, the distance L is desirably short and the height T20 is desirably large from the viewpoint of defining the alignment direction of the liquid crystal molecules LM. In consideration of productivity at the time of forming the structure 20 by a manufacturing method using a mold to be described later, however, the distance L is desirable to be large and the height T20 is desirable to be small.

The plurality of liquid crystal molecules LM of the first liquid crystal layer LC1 are located between the adjacent structures 20 and are also located above the structures 20. The alignment direction of the plurality of liquid crystal molecules LM of the first liquid crystal layer LC1 is defined by the adjacent structures 20. A relationship between the alignment direction and the structures 20 will be described later with reference to FIG. 1.

In the first liquid crystal layer LC1, the alignment directions of the plurality of liquid crystal molecules LM sequential in the Z direction are uniformly aligned. In other words, the director of the first liquid crystal layer LC1 is uniformly aligned over the entire area sequential in the Z direction. The plurality of liquid crystal molecules LM of the first liquid crystal layer LC1 are aligned by the excluded volume effect. In the groove g, the director of the first liquid crystal layer LC1 extends along the groove g. As a result, each of the plurality of liquid crystal molecules LM is aligned in a predetermined direction in the X-Y plane.

The liquid crystal layer LC1 contains nematic liquid crystal. The first liquid crystal layer LC1 is formed of an ultraviolet-curable nematic liquid crystal. For this reason, the plurality of liquid crystal molecules LM sequential in the Z direction are not twisted.

It is assumed here that the first liquid crystal layer LC1 is formed of an ultraviolet-curable cholesteric liquid crystal. In the case of the cholesteric liquid crystal, the plurality of liquid crystal molecules LM sequential in the Z direction are twisted. This is because the size of the liquid crystal molecules LM in a cholesteric liquid crystal is several nm and the liquid crystal molecules LM are not aligned along the groove g from a geometric viewpoint.

The first liquid crystal layer LC1 using nematic liquid crystal is cured with the alignment direction of the liquid crystal molecules LM fixed. In other words, the alignment directions of the liquid crystal molecules LM are not controlled depending on the electric field. The first liquid crystal layer LC1 is formed by, for example, applying light or other energy to the monomer and polymerizing the monomer. The first liquid crystal layer LC1 functions as an alignment film.

The second liquid crystal layer LC2 includes a third surface S3 that is opposed to the upper surface 20T and is in contact with the second surface S2, and a fourth surface S4 on a side opposite side to the third surface S3. In the embodiment, the third surface S3 is not in contact with the upper surface 20T. The second liquid crystal layer LC2 has a thickness DLC2. The thickness DLC2 corresponds to a distance from the third surface S3 to the fourth surface S4 in the Z direction. For example, the thickness DLC2 is 1,000 to 14,000 nm and, desirably, 5,000 to 12,000 nm.

In the example shown in FIG. 2, no other thin film or substrate overlaps the second liquid crystal layer LC2 in the Z direction. In other words, the fourth surface S4 is the surface in contact with the air, in the second liquid crystal layer LC2. The fourth surface S4 may be covered with the other thin film such as a horizontal alignment film or a protective film.

The second liquid crystal layer LC2 includes a plurality of liquid crystal structures LMS. The liquid crystal structures LMS include first liquid crystal molecules LM1 located at one end side of the second liquid crystal layer LC2 and second liquid crystal molecules LM2 located at the other end side of the second liquid crystal layer LC2. The first liquid crystal molecule LM1 is close to the third surface S3, and the second liquid crystal molecule LM2 is close to the fourth surface S4.

The director of the second liquid crystal layer LC2 is uniformly aligned with the director of the first liquid crystal layer LC1 on the second surface S2 side, on the third surface S3 side. For example, in the area overlapping the groove g, the director of the second liquid crystal layer LC2 is uniformly aligned with the director of the first liquid crystal layer LC1 on the second surface S2 side, on the third surface S3 side. In the cross section of FIG. 2, the director of the second liquid crystal layer LC2 on the third surface S3 side and the director of the first liquid crystal layer LC1 on the second surface S2 side are parallel to the Y direction. In planar view, the director of the second liquid crystal layer LC2 turns.

The alignment direction of the first liquid crystal molecule LM1 is defined by the alignment restriction force of the first liquid crystal layer LC1, which functions as an alignment film. Each liquid crystal structure LMS can be regarded as a continuum in which a plurality of liquid crystal molecules including the first liquid crystal molecule LM1 and the second liquid crystal molecule LM2 are arranged in the Z direction. For this reason, the alignment direction of the first liquid crystal molecule LM1 is defined, and the alignment direction of the plurality of liquid crystal molecules aligned in the Z direction, including the second liquid crystal molecule LM2, is defined according to the alignment direction of the first liquid crystal molecule LM1. As a result, the plurality of liquid crystal molecules including the first liquid crystal molecule LM1 and the second liquid crystal molecule LM2 in each liquid crystal structure LMS are aligned in a predetermined direction in the X-Y plane.

The second liquid crystal layer LC2 contains cholesteric liquid crystal. The second liquid crystal layer LC2 is formed of ultraviolet-curable cholesteric liquid crystal. The second liquid crystal layer LC2 is cured in a state in which the alignment directions of the liquid crystal molecules LM containing the first liquid crystal molecule LM1 and the second liquid crystal molecule LM2 are fixed. In other words, the alignment directions of the liquid crystal molecules LM are not controlled depending on the electric field. The second liquid crystal layer LC2 is formed by, for example, applying light or other energy to the monomer and polymerizing the monomer. The second liquid crystal layer LC2 functions as an optical layer.

In the first liquid crystal layer LC1 and the second liquid crystal layer LC2, the alignment directions of the plurality of liquid crystal molecules LM are not controlled depending on the electric field. For this reason, the liquid crystal optical element 1 does not comprise an electrode for the alignment control.

As shown in FIG. 1, the plurality of structures 20 are formed to have substantially the same shape in planar view and are each curved. In planar view, each of the grooves g is also curved. The plurality of structures 20 are arranged and spaced apart in the X direction.

The liquid crystal molecules LM of the first liquid crystal layer LC1 between the pair of structures 20 adjacent to each other in the X direction are cured in a state in which longer axes LX thereof are aligned along the tangent TL of the structures 20. The tangent TL is, for example, the tangent which is in contact with the outer edge of the bottom surface 20B of the structure 20. In other words, the director of the first liquid crystal layer LC1 extends along the groove g in the area overlapping the groove g.

FIG. 3, FIG. 4, FIG. 5, and FIG. 6 illustrate an example of a method of manufacturing the liquid crystal optical element 1.

Figure 3:
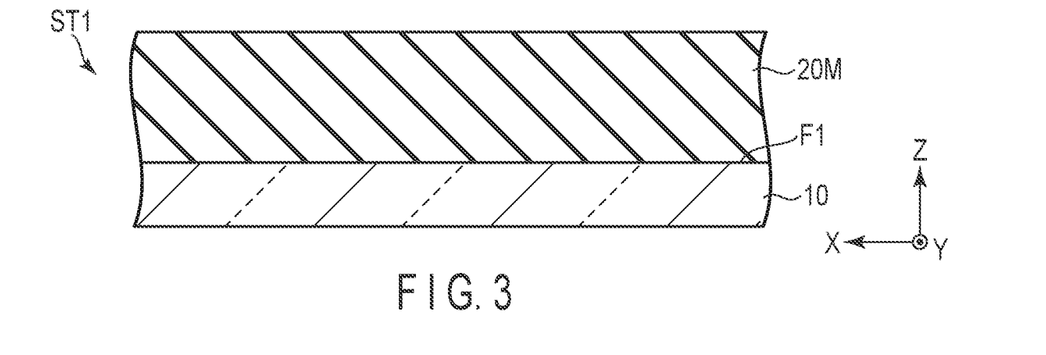
FIG. 3 is a cross-sectional view illustrating a method of manufacturing the liquid crystal optical element, showing a state in which a structure material is applied on a substrate.

As shown in FIG. 3, when manufacturing the liquid crystal optical element 1 is started, first, the substrate 10 is prepared, a transparent structure material 20M is applied to the main surface F1 of the substrate 10, and the solvent is removed to form a temporarily cured state of the structure material 20M, in step ST1. An ultraviolet curing resin can be applied as the structure material 20M.

Figure 4:
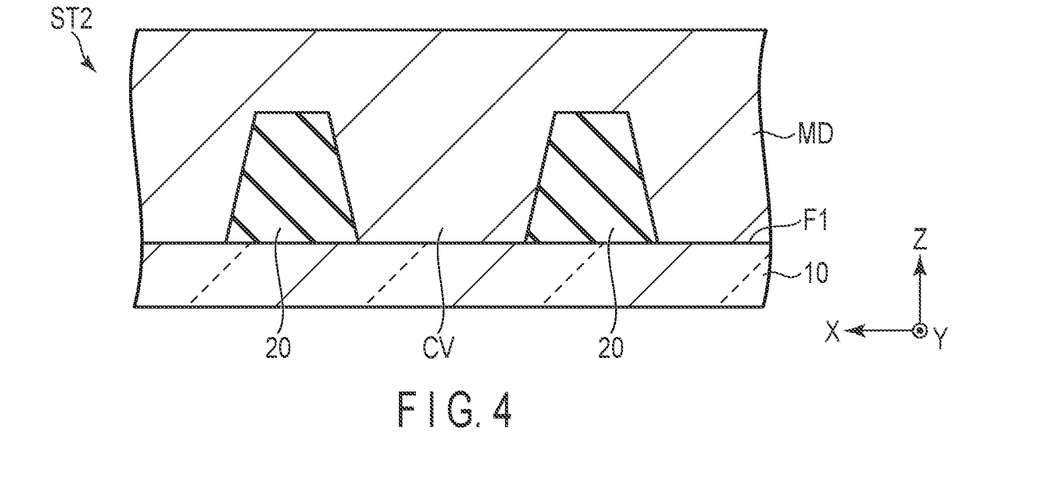
FIG. 4 is a cross-sectional view illustrating the method of manufacturing the liquid crystal optical element, subsequently with FIG. 3, showing the state in which a mold is pressurized toward the substrate from above the structures.

As shown in FIG. 4, when the processing is then shifted to step ST2, a mold MD in which recess portions corresponding to the shapes of the structures 20 are formed is prepared in advance, the mold MD is made to overlap the structure material 20M and irradiated with ultraviolet rays while pressurized. As a result, the structure material 20M is cured into the shape corresponding to the recess portions of the mold MD, and the structures 20 are formed. After that, the mold MD is removed.

In the example shown in FIG. 4, ultraviolet light is applied in a state in which a convex portion CV of the mold MD is in contact with the main surface F1. For this reason, the formed structures 20 are separated from each other and the main surface F1 between the structures 20 is exposed.

When the mold MD is pressurized, ultraviolet light may be applied in a state in which the structure material 20M is interposed between the convex portion CV and the main surface F1. In this case, the main surface F1 between the structures 20 is covered with a thin film of the same material as the structures 20.

Figure 5:
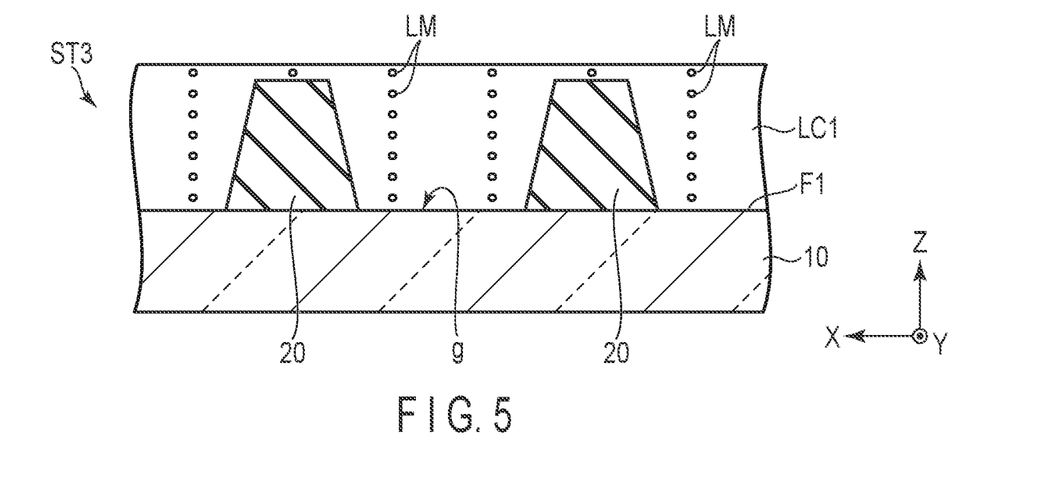
FIG. 5 is a cross-sectional view illustrating the method of manufacturing the liquid crystal optical element, subsequently with FIG. 4, shows a state in which a first liquid crystal layer is formed on the substrate and a plurality of structure materials.

As shown in FIG. 5, when the processing is then shifted to step ST3, the first liquid crystal layer LC1 is formed on the substrate 10 and the structures 20. For example, the first liquid crystal layer LC1 is formed in the following manner. First, an ultraviolet-curable nematic liquid crystal is applied so as to be in contact with the main surface F1 and the structures 20. Then, the ultraviolet-curable nematic liquid crystal is cured by applying light such as ultraviolet light to form the first liquid crystal layer LC1.

However, the alignment directions of the liquid crystal molecules LM contained in the nematic liquid crystal are fixed in the following manner, at stages before the nematic liquid crystal is cured. In other words, in the area overlapping the groove g, the plurality of liquid crystal molecules LM of the first liquid crystal layer LC1 are aligned along the groove g and horizontally aligned along the X-Y plane, and the longer axes of the liquid crystal molecules LM are aligned along the tangent of the structures 20. The alignment directions of the plurality of liquid crystal molecules LM arranged in the Z direction are substantially the same. The liquid crystal molecules LM located above the structures 20 are aligned in accordance with the surrounding liquid crystal molecules LM.

Thus, the curing process of the nematic liquid crystal is executed after the alignment directions of the plurality of liquid crystal molecules LM are fixed.

Figure 6:
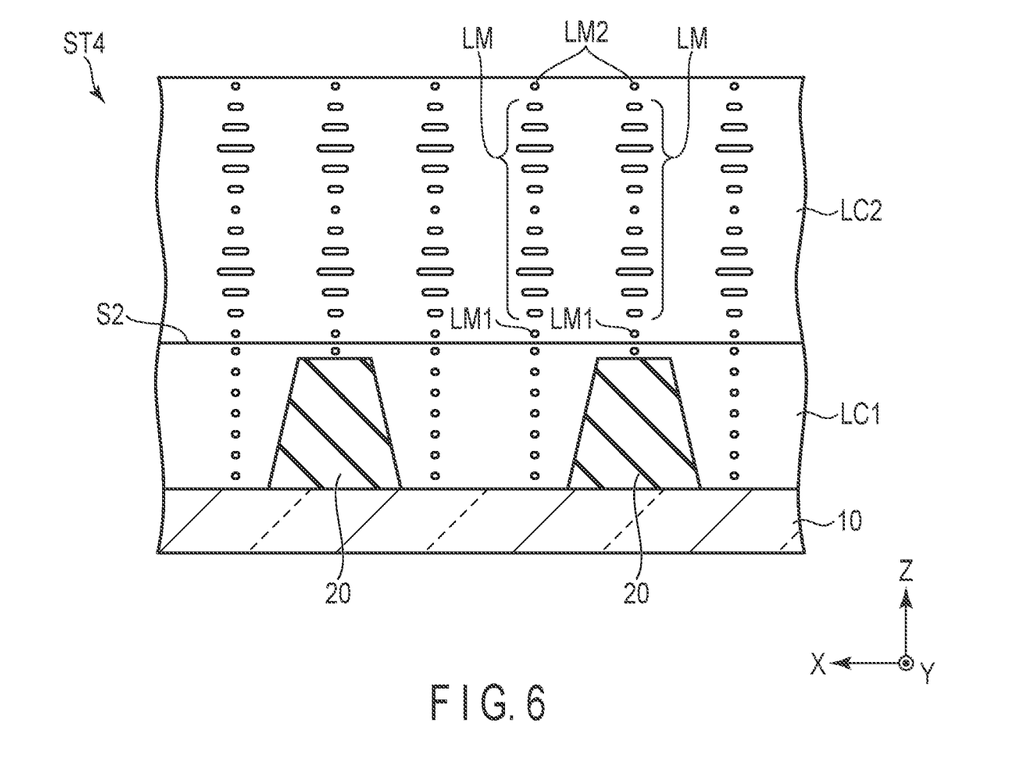
FIG. 6 is a cross-sectional view illustrating the method of manufacturing the above liquid crystal optical element, subsequently with FIG. 5, showing a state in which a second liquid crystal layer is formed on the first liquid crystal layer.

As shown in FIG. 6, when the processing is then shifted to step ST4, the second liquid crystal layer LC2 is formed on the first liquid crystal layer LC1. For example, the second liquid crystal layer LC2 is formed in the following manner. First, an ultraviolet-curable cholesteric liquid crystal is applied so as to be in contact with the second surface S2. Then, the ultraviolet-curable cholesteric liquid crystal is cured by applying light such as ultraviolet light to form the second liquid crystal layer LC2.

However, the alignment directions of the liquid crystal molecules contained in the cholesteric liquid crystal are fixed in the following manner, at stages before the cholesteric liquid crystal is cured. In other words, the first liquid crystal molecule LM1 that is close to the first liquid crystal layer LC1 is aligned along the liquid crystal molecules LM of the first liquid crystal layer LC1. The alignment directions of the liquid crystal molecules LM (containing the second liquid crystal molecule LM2) overlapping the first liquid crystal molecule LM1 in the Z direction is determined depending on the alignment direction of the first liquid crystal molecule LM1. The cholesteric liquid crystal is a chiral nematic liquid crystal in which a chiral agent is added to the nematic liquid crystal. The plurality of liquid crystal molecules LM in the second liquid crystal layer LC2 overlap in the Z direction while turning with respect to the first liquid crystal molecule LM1.

Thus, the process of curing the cholesteric liquid crystal is executed after the alignment direction of each liquid crystal molecule LM is fixed depending on the alignment direction of the first liquid crystal molecule LM1.

The manufacture of the liquid crystal optical element 1 is ended through the above-described processes.

According to the liquid crystal optical element 1 configured as described above, the structures 20 are formed by utilizing a nanoimprint technology. Minute structures 20 can easily be formed using a mold MD having minute uneven parts on the wavelength order of light. The structures 20 comprise a function of defining the alignment directions of the liquid crystal molecules LM contained in the nematic liquid crystal when the nematic liquid crystal is applied thereto. The nematic liquid crystal itself also comprises a property of uniformly aligning the alignment directions of the plurality of liquid crystal molecules LM in the Z direction.

The pattern of the structures 20 is formed such that the liquid crystal molecules LM form a desired alignment pattern. For this reason, the nematic liquid crystal is cured in a state in which the alignment direction of each liquid crystal molecule is fixed in a predetermined direction, and the first liquid crystal layer LC1 is formed. The cholesteric liquid crystal is also cured in a state in which the alignment direction of each liquid crystal molecule is fixed in a predetermined direction, and the second liquid crystal layer LC2 is formed. The second liquid crystal layer LC2 having a predetermined retardation is formed.

Therefore, the liquid crystal optical element 1 having the desired optical characteristics can be obtained. In addition, the liquid crystal optical element 1 that can be mass-produced can be obtained.

Incidentally, the alignment process may be executed by patterning the alignment instead of forming the structures 20. Patterning the alignment is considered to be implemented by mask exposure, interference, or locally rubbing or photo alignment, but has a problem that mass production is low. In addition, increasing in size which is difficult by interference or locally rubbing or photo alignment can be achieved by employing the nanoimprinting technology.

Figure 7:
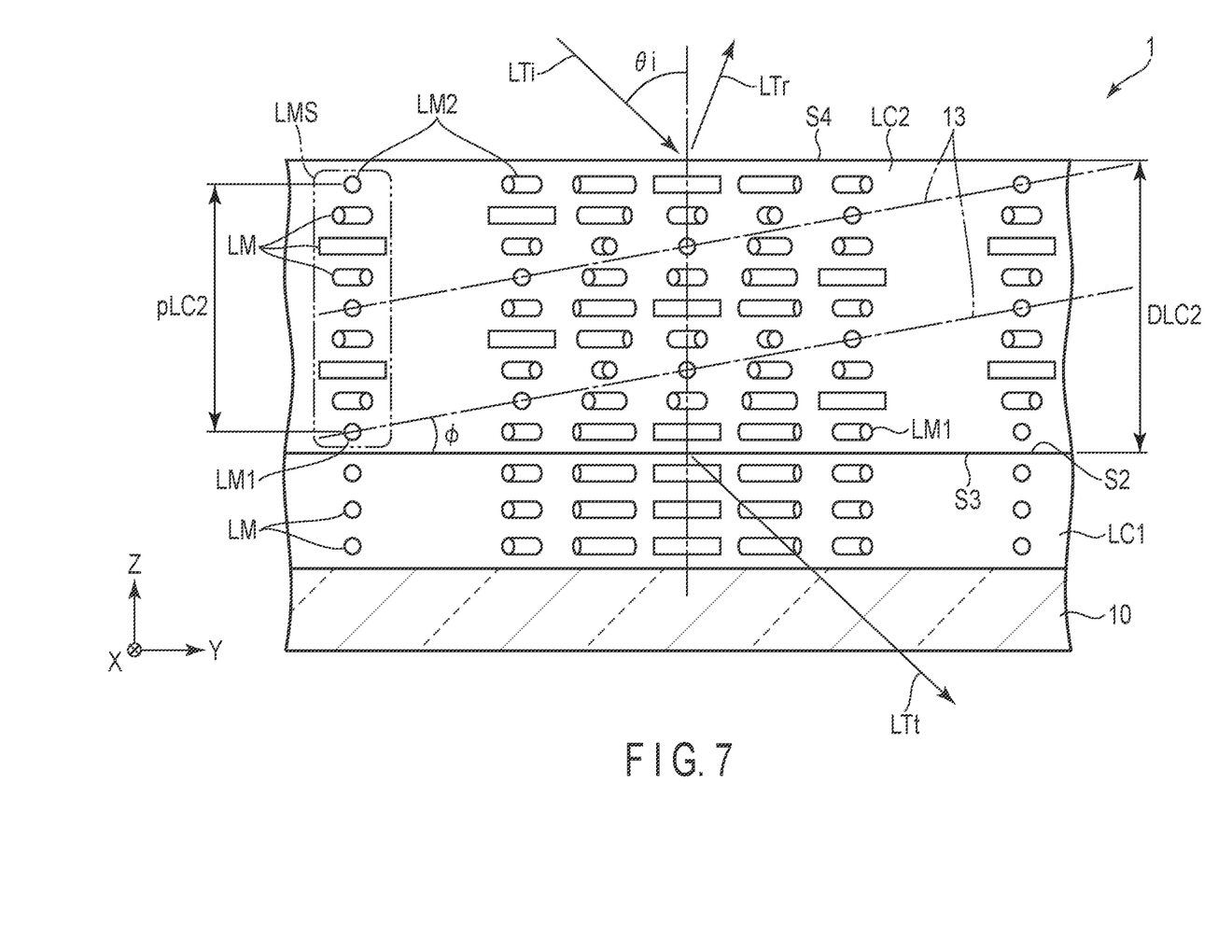
FIG. 7 is a cross-sectional view showing the liquid crystal optical element taken along line VII-VII in FIG. 1.

Next, a concrete configuration example of the liquid crystal optical element 1 of the embodiment will be described. FIG. 7 is a cross-sectional view showing the liquid crystal optical element 1 taken along line VII-VII in FIG. 1. The liquid crystal optical element 1 functions as a reflective diffraction grating.

As shown in FIG. 7, the second liquid crystal layer LC2 contains a cholesteric liquid crystal. To simplify the illustration in FIG. 7, one liquid crystal molecule LM represents a liquid crystal molecule facing in the average alignment direction, of the plurality of liquid crystal molecules located in the X-Y plane. In other words, the alignment of each liquid crystal molecule LM is equal to the director. The alignment directions of the plurality of first liquid crystal molecules LM1 arranged along the second surface S2 of the first liquid crystal layer LC1 are changed continuously in the Y direction.

When one liquid crystal structure LMS is focused, the plurality of liquid crystal molecules LM are stacked spirally in the Z direction while turning. The alignment direction of the first liquid crystal molecules LM1 is substantially the same as the alignment direction of the second liquid crystal molecule LM2. The liquid crystal structure LMS has a helical pitch pLC2. The helical pitch pLC2 indicates one period (360 degrees) of the spiral.

The second liquid crystal layer LC2 has a plurality of reflective surfaces 13 as represented by one-dot chain lines. For example, the plurality of reflective surfaces 13 are substantially parallel to each other. The reflective surfaces 13 are tilted to the second surface S2 and have a substantially flat shape extending in a certain direction. The reflective surfaces 13 selectively reflect part of light LTr of incident light LTi and allow other light LTt to be transmitted according to the Bragg's law. The reflective surfaces 13 reflect the light LTr according to the tilt angle (p of the reflective surfaces 13 relative to the second surface S2.

In the example shown in FIG. 7, the helical pitch pLC2 is shown as a distance in the Z direction between the first liquid crystal molecule LM1 and the second liquid crystal molecule LM2, but a thickness DLC2 of the second liquid crystal layer LC2 is desirably five times or more as large as the helical pitch pLC2 from the viewpoint of improving the reflectivity on the reflective surfaces 13.

The second liquid crystal layer LC2 formed of the cholesteric liquid crystal selectively reflects light. The reflection efficiency of the second liquid crystal layer LC2 varies depending on the relationship between the thickness DLC2 and the helical pitch pLC2. The thickness DLC2 depends on parameters of the second liquid crystal layer LC2 such as the helical pitch pLC2.

As described above, the thickness DLC2 is desirably five times or more as large as the helical pitch pLC2 from the viewpoint of reflection efficiency. Even if the thickness DLC2 is four times or more as large as the helical pitch pLC2, the desired reflection efficiency may be obtained. When the thickness DLC2 is about 4.5 times as large as the helical pitch pLC2, the reflection efficiency tends to be saturated.

When the thickness DLC2 is about three times as large as the helical pitch pLC2, it is difficult to obtain the desired reflection efficiency. This is because if the thickness DLC2 is too small, the reflection efficiency decreases.

In contrast, when the thickness DLC2 becomes too large, the reflection efficiency is not affected, but applying the liquid crystal is difficult. In addition, since an alignment restriction force cannot be exerted on the liquid crystal molecules LM on the fourth surface S4 side of the second liquid crystal layer LC2 from the side opposed to the fourth surface S4, it is difficult to align the liquid crystal molecules LM on the fourth surface S4 side of the second liquid crystal layer LC2.

The reflective surface 13 corresponds to a surface where the alignment directions of the liquid crystal molecules LM are uniformly aligned or a surface (equiphase wave surface) where the spatial phase is uniformly aligned. The shape of the reflective surface 13 is not limited to a flat shape, but may also be a concave or convex curved shape and is not particularly limited. In addition, a part of the reflective surface 13 may be uneven, the tilt angle φ of the reflective surface 13 may not be uniform, or the plurality of reflective surfaces 13 may not be regularly aligned. The reflective surface 13 having any shape can be configured depending on the spatial phase distribution of the liquid crystal structure LMS.

The cholesteric liquid crystal, which is the liquid crystal structure LMS, reflects circularly polarized light in the same turning direction as that of the cholesteric liquid crystal, of the light of a predetermined wavelength λ included in the selective reflection band Δλ. For example, when the turning direction of the cholesteric liquid crystal is right-handed, the liquid crystal reflects the right-handed circularly polarized light, of the light of a predetermined wavelength λ, and allows the left-handed circularly polarized light to be transmitted. Similarly, when the turning direction of the cholesteric liquid crystal is left-handed, the liquid crystal reflects the left-handed circularly polarized light, of the light of a predetermined wavelength λ, and allows the right-handed circularly polarized light to be transmitted.

When the helical pitch of the cholesteric liquid crystal is referred to as pLC2, the refractive index of the liquid crystal molecule for abnormal light is referred to as ne, and the refractive index of the liquid crystal molecule for normal light is referred to as no, the selective reflection band Δλ of the cholesteric liquid crystal for vertically incident light is generally represented as "no*pLC2 to ne*pLC2". In detail, the selective reflection band Δλ of the cholesteric liquid crystal is varied in the range of "no*pLC2 to ne*pLC2", depending on the tilt angle φ of the reflective surface 13, the incident angle θi, and the like.

In the liquid crystal optical element 1 that functions as a reflective diffraction grating, the cholesteric liquid crystal of the second liquid crystal layer LC2 has a reflective surface 13, i.e., a periodic characteristic. The second liquid crystal layer LC2 can reflect and diffract the only light of a specific wavelength.

(Example of Alignment Pattern)

Figure 8:
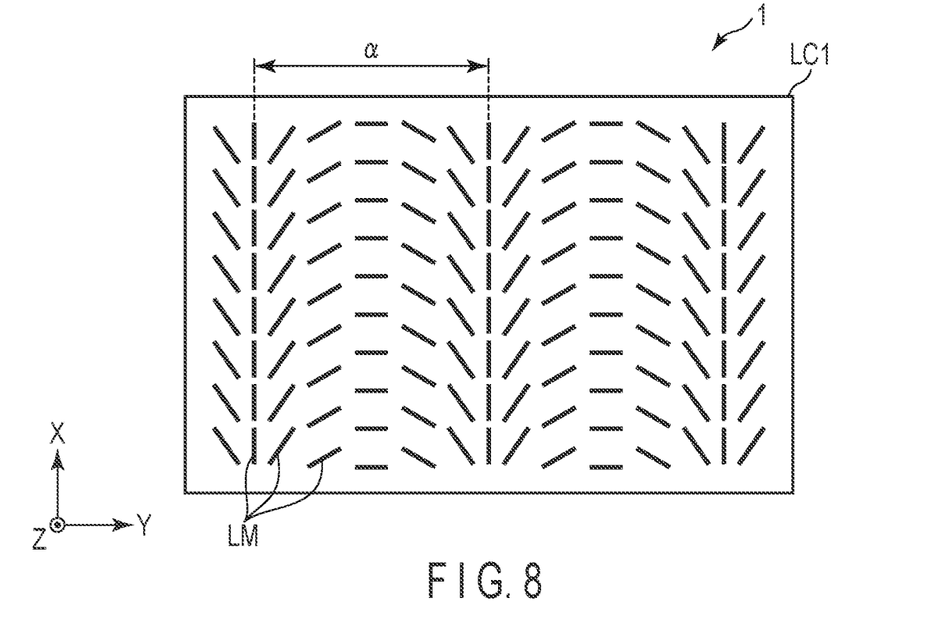
FIG. 8 is a plan view showing the alignment pattern in the first liquid crystal layer.

Next, an example of the alignment pattern in the first liquid crystal layer LC1 will be described. FIG. 8 is a plan view showing the alignment pattern in the first liquid crystal layer LC1. In FIG. 8, the illustration of the structure 20 is omitted.

As shown in FIG. 8, the alignment directions of the liquid crystal molecules LM arranged in the Y direction are different from each other. In other words, the spatial phase in the X-Y plane is different along the Y direction. For example, the alignment direction of each of the liquid crystal molecules LM changes by a certain angle along the Y direction (from a left side to a right side in the figure). The amount of variation in the alignment directions of the liquid crystal molecules LM is constant along the Y direction, but may be gradually increased or gradually decreased.

As shown in FIG. 8, an interval between two liquid crystal molecules LM when the alignment direction of the first liquid crystal molecule LM1 changes by 180 degrees along the Y direction is defined as an alignment pitch α.

In contrast, the alignment directions of the liquid crystal molecules LM arranged in the X direction are substantially the same. In other words, the spatial phase in the X-Y plane is substantially the same in the X direction.

Next, several layout examples of the structures 20 to implement the alignment pattern shown in FIG. 8 will be described.

(First Layout)

Figure 9:
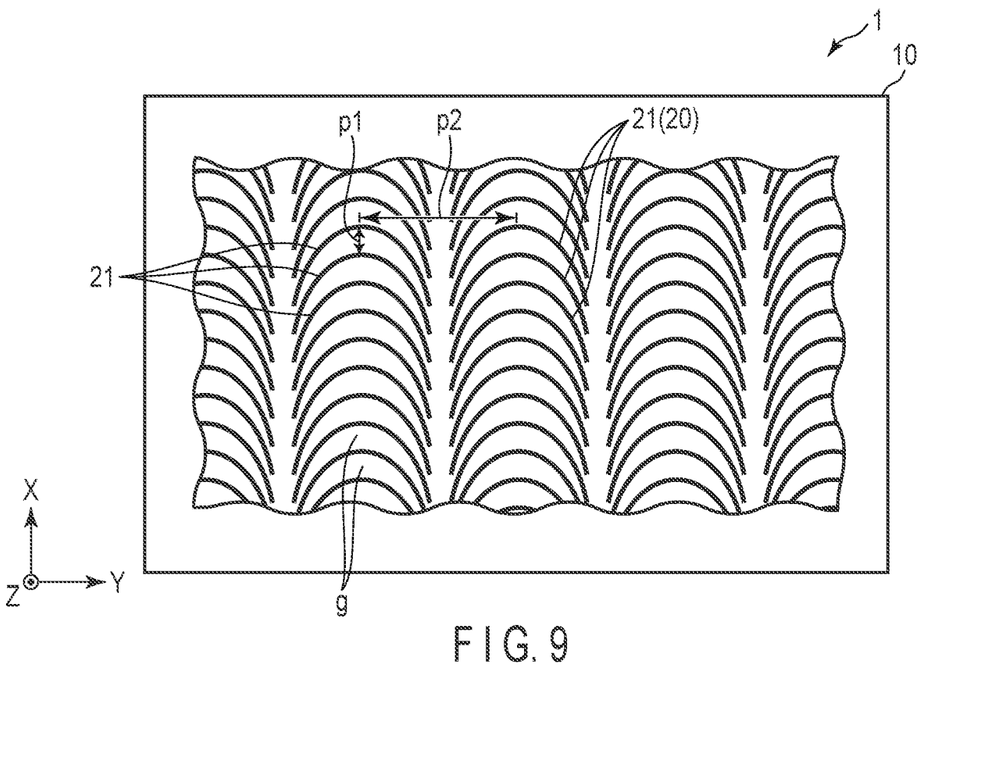
FIG. 9 is a plan view showing a first layout of the plurality of structures.

FIG. 9 is a plan view showing a first layout of the plurality of structures 20. As shown in FIG. 9, the first layout corresponds to an example in which the plurality of structures 20 include one type of structure (first structure) 21. Each of the structures 21 is similarly curved in planar view.

The plurality of structures 21 are arranged in each of the X direction and the Y direction. The plurality of structures 21 are arranged in the X direction at first pitches p1. In addition, the plurality of structures 21 are arranged in the Y direction at second pitches p2 different from the first pitches p1. For example, the second pitch p2 is larger than the first pitch p1. The second pitch p2 is equal to the alignment pitch α shown in FIG. 8. The pair of structures 20 that form the groove g is a pair of structures 21 that are adjacent to each other in the X direction, of the plurality of structures 21.

According to this first layout, the liquid crystal molecules in the groove g are aligned along the tangent of the structures 21. The liquid crystal molecules in groove g are aligned along the groove g. The alignment directions of the liquid crystal molecules arranged in the Y direction are continuously changed. The liquid crystal molecules between the structures 21 adjacent in the Y direction are aligned in the X direction.

(Second Layout)

Figure 10:
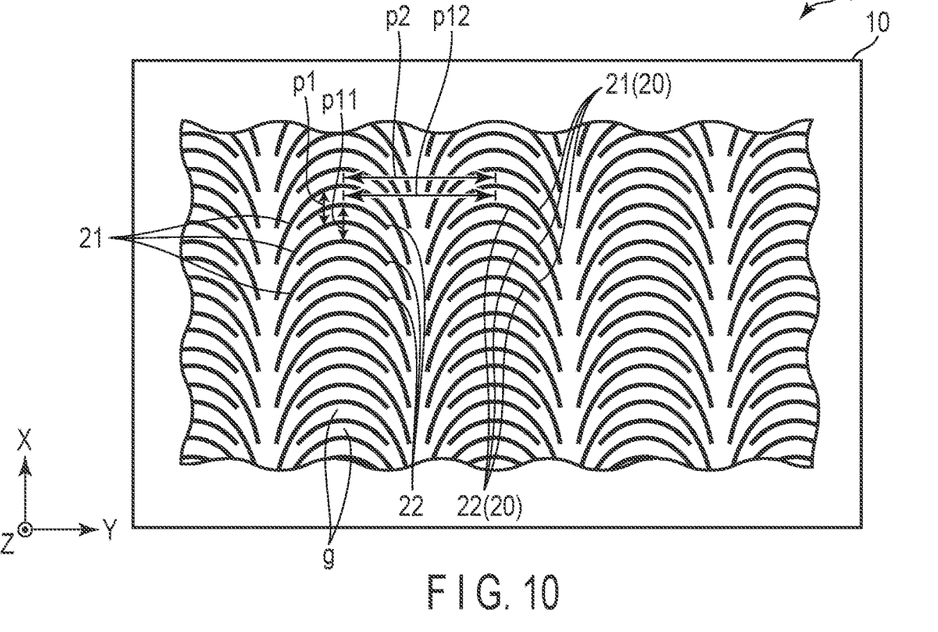
FIG. 10 is a plan view showing a second layout of the plurality of structures.

FIG. 10 is a plan view showing a second layout of the plurality of structures 20. As shown in FIG. 10, the second layout corresponds to an example in which the plurality of structures 20 include plural types of structures (first structures) 21 and structures (second structures) 22. In other words, the second layout is different from the first layout in that structures 22 are added. Each of the structures 22 has a shape different from that of the structures 21 and is curved in planar view.

The different shape in this example means that the total length of the structure 22 may be different from the total length of the structure 21, the curvature of the structure 22 is different from the curvature of the structure 21, and the like. In the example shown in FIG. 10, the total length of the structure 22 is shorter than the total length of the structure 21, but the curvature of the structure 22 is substantially the same as the curvature of structure 21.

The plurality of structures 22 are arranged in each of the X direction and the Y direction. The structures 21 and 22 are alternately arranged in the X direction. When one structure 22 is focused, the structure 22 is arranged between a pair of structures 21 adjacent in the X direction. In addition, one structure 22 is located at a substantially middle point between the pair of structures 21. A plurality of structures 22 may be provided between the pair of structures 21.

The plurality of structures 22 are arranged in the X direction at pitches p11. In addition, the plurality of structures 22 are arranged in the Y direction at pitches p12 different from the pitches p11. For example, the pitch p11 is equal to the first pitch p1, and the pitch p12 is equal to the second pitch p2, and the pitch p12 is equal to the alignment pitch α.

According to this second layout, the liquid crystal molecules between the structures 21 and 22 adjacent to each other in the X direction are aligned along the respective tangents of the structures 21 and 22. The structures 21 and 22 form a groove ga between them, and the liquid crystal molecules are aligned along the groove ga in the groove ga. The alignment directions of the liquid crystal molecules arranged in the Y direction are continuously changed. The liquid crystal molecules between the structures 21 adjacent in the Y direction are aligned in the X direction.

(Third Layout)

Figure 11:
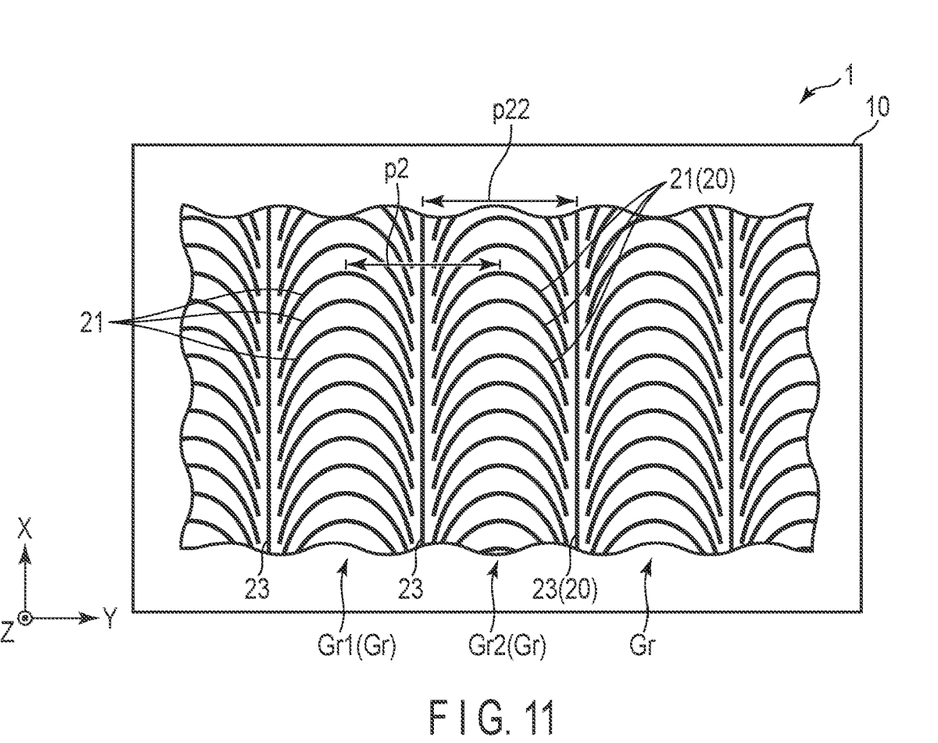
FIG. 11 is a plan view showing a third layout of the plurality of structures.

FIG. 11 is a plan view showing a third layout of the plurality of structures 20. As shown in FIG. 11, the third layout corresponds to an example in which the plurality of structures 20 include plural types of structures (first structures) 21 and structures (third structures) 23. In other words, the third layout is different from the first layout in that the structures 23 are added. In the third layout, the structures 22 may be further added, similarly to the second layout shown in FIG. 10.

The plurality of structures 21 include a plurality of first structures 21, which belong to respective groups Gr and are arranged in the X direction. For example, the plurality of first structures 21 belonging to a first group Gr1 and the plurality of first structures 21 belonging to a second group Gr2 are adjacent to each other in the Y direction.

Each of the structures 23 has a shape different from that of the structures 21 in planar view and extends linearly in the X direction. The structures 23 are disposed between the structures 21 adjacent in the Y direction. For example, the structure 23 is located between the first group Gr1 and the second group Gr2. The plurality of structures 23 are arranged in the Y direction at pitches p22. For example, the pitch p22 is equal to the second pitch p2, and the pitch p22 is equal to the alignment pitch α.

According to this third layout, the liquid crystal molecules between the structures 21 adjacent in the X direction are aligned along the tangents of the structures 21, and the alignment directions of the liquid crystal molecules arranged in the Y direction are continuously changed. The liquid crystal molecules between the structures 21 adjacent in the Y direction are aligned along the structure 23.

As described above, according to the embodiment, the liquid crystal optical element 1 that can be mass-produced can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Figure 12:
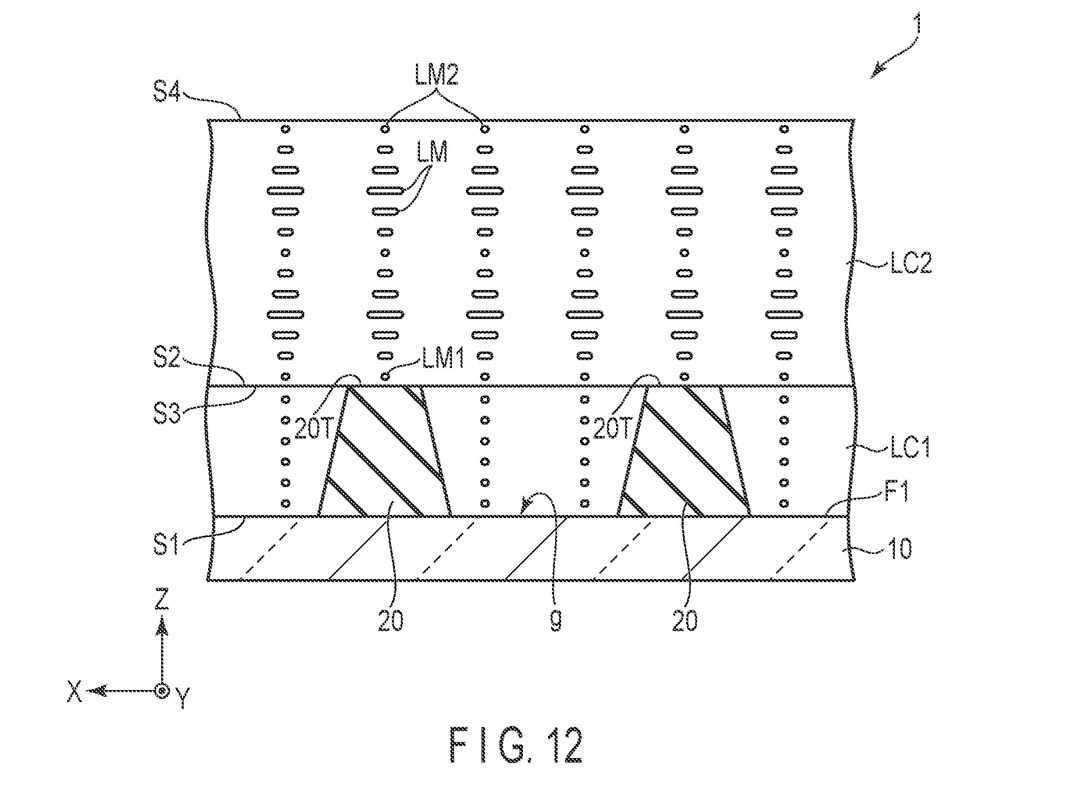
FIG. 12 is a cross-sectional view showing a liquid crystal optical element according to a modified example of the embodiment.

For example, as shown in FIG. 12, the second surface S2 of the first liquid crystal layer LC1 may be located on the same plane as an upper surface 20T of the structure 20. The third surface S3 of the second liquid crystal layer LC2 is in contact with the second surface S2 and the plurality of upper surfaces 20T. In the second liquid crystal layer LC2, the alignment direction of the first liquid crystal molecule LM1 just above the structure 20 is also restricted. Immediately above the structure 20, the first liquid crystal molecule LM1 does not directly receive the alignment restriction force from the first liquid crystal layer LC1 since the alignment restriction force acts between the first liquid crystal molecules LM1 adjacent to each other in the X or Y direction.

The above-described liquid crystal optical element 1 is not limited to application to reflective diffraction gratings. The liquid crystal optical element 1 can also be applied to optical elements such as reflective lenses and holograms by patterning the liquid crystal alignment.

What is claimed is:

1. A liquid crystal optical element comprising:
    a substrate including a main surface;
    a plurality of structures each including a bottom surface opposed to the main surface and an upper surface on a side opposite to the bottom surface, and arranged and spaced apart at intervals;
    a first liquid crystal layer including a first surface opposed to the main surface, a second surface on a side opposite to the first surface, and a plurality of liquid crystal molecules having alignment directions fixed, and provided between the plurality of structures and cured; and
    a second liquid crystal layer including a third surface opposed to the upper surface and being in contact with the second surface, a fourth surface on a side opposite to the third surface, and a plurality of liquid crystal molecules having alignment directions fixed, and cured, a pair of adjacent structures of the plurality of structures forming a groove therebetween, in an area overlapping the groove,
- a first director of the first liquid crystal layer extending along the groove, and
- a second director of the second liquid crystal layer being uniformly aligned with the first director of the second surface side, on the third surface side, and turning in planar view.

2. The liquid crystal optical element of claim 1, wherein the second surface is located on the same plane as the upper surface, or the upper surface is covered with the first liquid crystal layer and located between the main surface and the second surface.

3. The liquid crystal optical element of claim 1, wherein each of the structures is formed of a transparent organic material, and a width of the bottom surface is larger than a width of the upper surface, in a direction in which the pair of structures are adjacent.

4. The liquid crystal optical element of claim 3, wherein a refractive index of each of the structures is substantially the same as a refractive index of the substrate.

5. The liquid crystal optical element of claim 3, wherein a height of each of the structures exceeds the width of the bottom surface.

6. The liquid crystal optical element of claim 1, wherein a distance between the bottom surfaces of the pair of structures in a direction in which the pair of structures are adjacent is substantially the same as a height of each of the structures or smaller than the height.

7. The liquid crystal optical element of claim 1, wherein each of the pair of structures is curbed and the groove is curbed, in planar view.

8. The liquid crystal optical element of claim 1, wherein the plurality of structures include a plurality of curbed first structures, the plurality of curbed first structures are arranged in the first direction at first pitches and arranged in a second direction intersecting the first direction at second pitches different from the first pitches, and the pair of structures are a pair of curbed first structures adjacent in the first direction, of the plurality of curbed first structures.

9. The liquid crystal optical element of claim 8, wherein the plurality of structures further include a second structure disposed between the pair of curbed first structures, and the second structure has a shape different from the curbed first structures and is curbed.

10. The liquid crystal optical element of claim 8, wherein the plurality of curbed first structures include:

a plurality of curbed first structures belonging to a first group and arranged in the first direction; and a plurality of curbed first structures that belong to a second group adjacent to the first group in the second direction and that are arranged in the first direction, and the plurality of structures further include a third structure located between the first group and the second group, and extending linearly in the first direction.

11. The liquid crystal optical element of claim 1, wherein the first liquid crystal layer contains nematic liquid crystal, and the second liquid crystal layer contains cholesteric liquid crystal.

* * * * *